United States Patent
Clingerman et al.

(10) Patent No.: US 8,722,259 B2
(45) Date of Patent: May 13, 2014

(54) FREEZE TOLERANT INTRODUCTION OF HYDROGEN TO CATHODE EXHAUST IN A FUEL CELL SYSTEM

(75) Inventors: Bruce J. Clingerman, Palmyra, NY (US); Aaron Rogahn, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1552 days.

(21) Appl. No.: 12/262,811

(22) Filed: Oct. 31, 2008

(65) Prior Publication Data

US 2010/0112410 A1  May 6, 2010

(51) Int. Cl.
*H01M 8/04* (2006.01)
(52) U.S. Cl.
USPC .......................................... 429/414; 429/444
(58) Field of Classification Search
None
See application file for complete search history.

(56) References Cited

U.S. PATENT DOCUMENTS

2006/0040158 A1* 2/2006 Numata et al. .................. 429/34
2006/0240309 A1* 10/2006 Dehne ............................. 429/38

* cited by examiner

*Primary Examiner* — Jonathan Crepeau
(74) *Attorney, Agent, or Firm* — John A. Miller; Miller IP Group, PLC

(57) ABSTRACT

A technique for reducing the amount of water that accumulates in an anode exhaust gas bleed line in a fuel cell system. The system includes a fuel cell stack, a cathode exhaust line and an anode exhaust line. The anode exhaust gas line is coupled to an anode bleed valve. An anode bleed line is coupled to the bleed valve and the cathode exhaust gas line so the hydrogen in the bled anode exhaust gas is diluted by the cathode exhaust gas. The anode bleed line is coupled to the cathode exhaust gas line so that a stand-off portion of the bleed line extends through a wall of the cathode exhaust gas line and into the cathode exhaust flow therein so as to prevent water and water vapor clinging to the inside surface of the cathode exhaust gas line from draining into the anode bleed line.

18 Claims, 2 Drawing Sheets

FREEZE TOLERANT INTRODUCTION OF HYDROGEN TO CATHODE EXHAUST IN A FUEL CELL SYSTEM

BACKGROUND OF THE INVENTION

1. Field of the Invention

This invention relates generally to a technique for limiting the amount of water that accumulates in an anode bleed line in a fuel cell system and, more particularly, to a technique for limiting the amount of water that accumulates in an anode bleed line of a fuel cell system that includes positioning an end of the anode bleed line part way into a cathode exhaust line.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack. The stack also includes flow channels through which a cooling fluid flows.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The MEAs are porous and thus allow nitrogen in the air from the cathode side of the stack to permeate therethrough and collect in the anode side of the stack, referred to in the industry as nitrogen cross-over. Nitrogen in the anode side of the fuel cell stack dilutes the hydrogen such that if the nitrogen concentration increases beyond a certain percentage, such as 50%, the fuel cell stack becomes unstable and may fail. It is known in the art to provide a bleed valve at the anode gas output of the fuel cell stack to remove nitrogen from the anode side of the stack.

The gas that is periodically bled from the anode side typically includes a considerable amount of hydrogen. Because the hydrogen will mix with air if it is vented to be in the environment, a potential combustible mixture may occur which provides obvious safety concerns. It is known in the art to direct the bled anode exhaust gas to the cathode exhaust gas line to be mixed with the cathode exhaust gas to reduce the concentration of hydrogen vented to the environment. Typically, it is desirable to maintain the percentage of hydrogen in the mixed anode and cathode exhaust gas to be less than a few percent by volume.

SUMMARY OF THE INVENTION

In accordance with the teachings of the present invention, a technique for reducing the amount of water that accumulates in an anode exhaust gas bleed line in a fuel cell system is disclosed. The fuel cell system includes a fuel cell stack, a cathode exhaust line and an anode exhaust line. The anode exhaust line is coupled to an anode bleed valve that is periodically opened during system operation to bleed the anode exhaust gas to an anode exhaust gas bleed line to remove nitrogen from the anode side of the stack. The anode exhaust gas bleed line is coupled to the cathode exhaust gas line so the hydrogen in the bled anode exhaust gas is diluted by the cathode exhaust gas. The anode bleed line is coupled to the cathode exhaust gas line so that a stand-off portion of the bleed line extends through a wall of the cathode exhaust gas line and into the cathode exhaust flow therein so as to prevent water and water vapor clinging to the inside surface of the cathode exhaust gas line from draining into the anode bleed line.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a technique for limiting water accumulation in an anode bleed line in a fuel cell system is merely exemplary in nature, and is in no way intended to limit the invention or its applications or uses.

Figure 1:
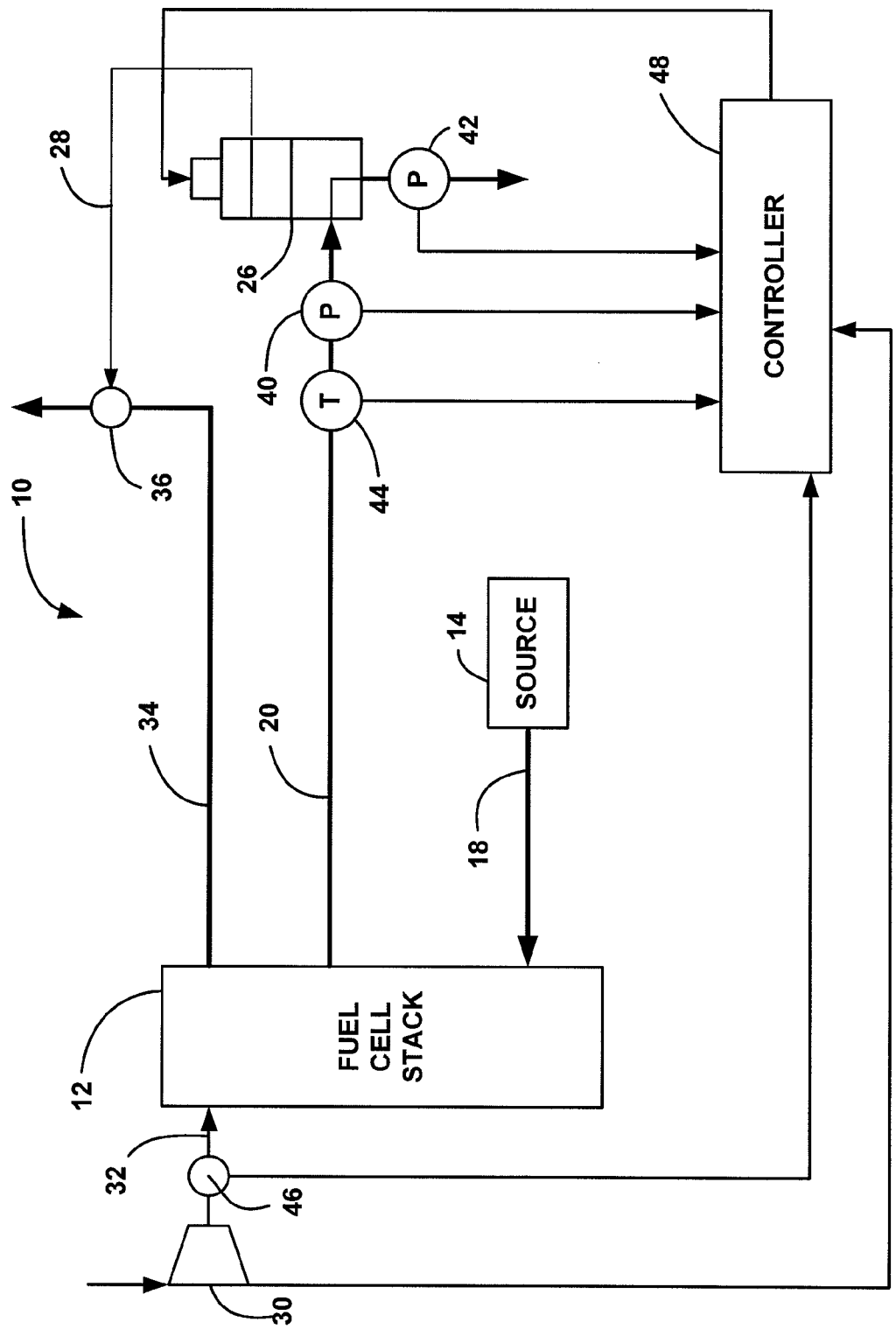
FIG. 1 is a schematic plan view of a fuel cell system including an anode exhaust bleed valve for bleeding anode exhaust gas into a cathode exhaust gas line.

FIG. 1 is a schematic block diagram of a fuel cell system 10 including a fuel cell stack 12. The fuel cell system 10 is intended to generally represent any type of fuel cell system that requires an anode exhaust gas bleed to remove nitrogen from the anode side of the stack 12, such as fuel cell systems that recirculate the anode exhaust gas back to the anode inlet and fuel cell systems that employ a split stack design with anode flow shifting. Hydrogen gas from a hydrogen source 14 is provided to the anode side of the fuel cell stack 12 on line 18. An anode exhaust gas is output from the fuel cell stack 12 on line 20 and is sent to a bleed valve 26. A cathode exhaust gas from the stack 12 is output from the stack 12 on cathode exhaust gas line 34. When the anode exhaust gas is bled through the bleed valve 26, the bled gas in line 28 is mixed with the cathode exhaust gas in line 34 in a mixing junction 36.

In order to monitor the anode sub-system, various sensors are provided in the system 10. Particularly, a pressure sensor 40 measures the pressure at the inlet to the bleed valve 26, a pressure sensor 42 measures the pressure at the outlet of the bleed valve 26 and a temperature sensor 44 measures the temperature of the anode exhaust gas at the inlet to the bleed valve 26. Further, a flow meter 46 measures the flow of air being input to the cathode side of the fuel cell stack 12. In an alternate embodiment, the flow meter can be eliminated and the flow rate of the compressor air can be derived based on various factors, such as a compressor map, compressor speed, inlet/outlet pressure, temperature, etc.

As discussed above, it is necessary to control the bleed of the anode exhaust gas to the cathode exhaust gas line 34 so that the concentration of hydrogen therein is maintained below a predetermined safe level. In order to perform this function, a controller 48 receives the temperature signal from the temperature sensor 44, the pressure signal from the pressure sensor 40, the pressure signal from the pressure sensor 42 and the flow signal from the flow meter 46. The controller 48 includes an algorithm that determines the concentration of hydrogen being bled from the bleed valve 26, and controls the compressor 30 and the bleed valve 26 to maintain the concentration of hydrogen in the combined exhaust gas below a predetermined level.

Figure 2:
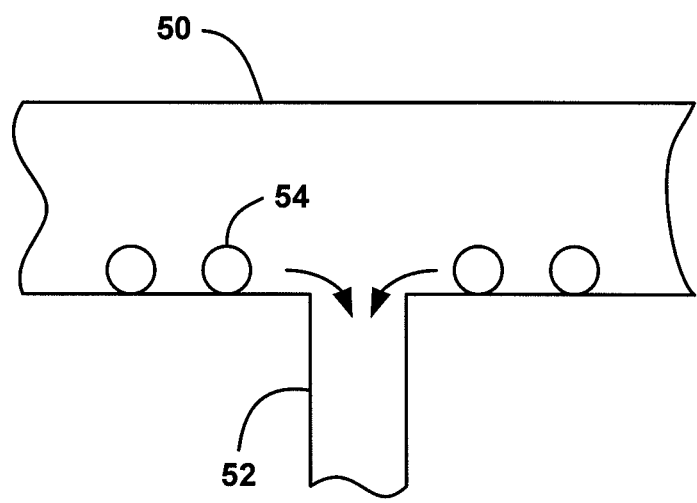
FIG. 2 is a representative view of a known way for coupling an anode exhaust gas bleed line to a cathode exhaust gas line.

Typically, the cathode exhaust line 34 has a diameter in the two to three inch range and the anode bleed line 28 has a diameter about 100 mm. FIG. 2 is a representative view of the junction 36 where the anode bleed line 28 is coupled to the cathode exhaust line 34. In FIG. 2, pipe 50 represents the cathode exhaust gas line 34 and pipe 52 represents the anode bleed line 28. The pipes 50 and 52 can be made of any rigid or flexible pipe material suitable for the purposes discussed herein. As is well understood in the art, the cathode exhaust gas includes a fair amount of liquid water and water vapor as a by-product of the electro-chemical reaction. Water droplets 54 in the cathode exhaust gas tend to cling to the inside surface of the pipe 50 as a result of surface tension.

When the system 10 is shut-down and there is no cathode exhaust gas force driving the water and water vapor out of the cathode exhaust pipe 50, the water droplets 54 have a tendency to flow into the anode bleed pipe 52, and accumulate therein between the cathode exhaust pipe 50 and the bleed valve 26. During sub-zero conditions, that water could freeze in the anode bleed pipe 52, possibly completely blocking the anode bleed pipe 52 and preventing an anode exhaust gas bleed for some time after the next start-up. Further, there is additional water in the anode bleed pipe 52 as a result of the water that is in the anode exhaust gas. Also, the water vapor in the cathode exhaust pipe 50 would condense when the system cooled after shut-down further adding to the amount of water available to accumulate in the anode bleed pipe 52. Further, the surface tension of the water droplets 54 within the pipe 50 could cause the water droplets 54 to travel into the anode bleed pipe 52 against the force of gravity.

The configuration of the various exhaust pipes and the size of the bleed valve 26 typically need to be such that they take up as little space as possible, and provide as low a cost as possible. Therefore, the positioning of the various pipes and valves may be different for different systems to accommodate packaging and the like, and may not be optimum for preventing water from accumulating in the anode bleed pipe 52.

Figure 3:
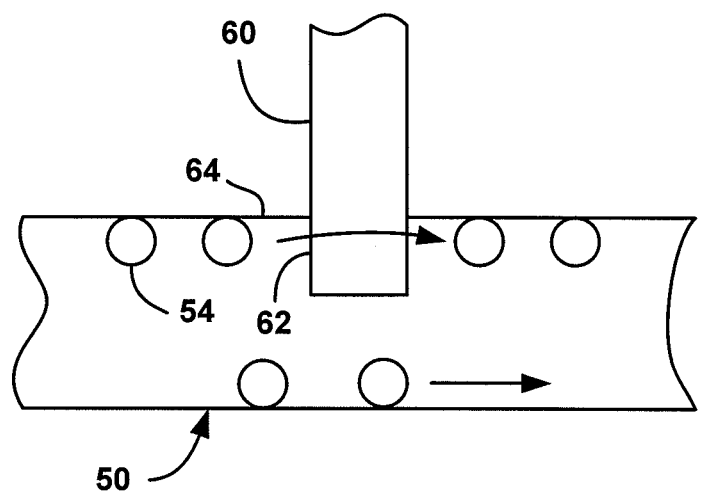
FIG. 3 is a technique for coupling an anode bleed line to an anode exhaust gas line that reduces the amount of water from the cathode exhaust gas that enters the anode bleed line, according to an embodiment of the present invention.

FIG. 3 is a plan view of a coupling location where an anode exhaust gas bleed line is coupled to a cathode exhaust gas line that is similar to FIG. 2, where like elements are identified by the same reference numeral, according to an embodiment of the present invention. In FIG. 3, the anode exhaust gas bleed pipe 52 is replaced with an anode exhaust gas bleed pipe 60. According to the invention, the anode bleed pipe 60 includes a stand-off portion 62 that extends through a wall 64 of the cathode exhaust gas pipe 50. Therefore, the water droplets 54 that accumulate and cling to the inside surface of the wall 64 are for the most part prevented from flowing into the anode bleed pipe 60 because they would have to climb up over the stand-off portion 62. Particularly, the water droplets 54 would go around the stand-off portion 62, instead of into the anode bleed pipe 60. In one non-limiting embodiment, the stand-off portion 62 extends about an inch into the flow path of the pipe 50.

Further, by positioning the stand-off portion 62 in the flow of the cathode exhaust gas, a ventury effect is produced around the top opening of the anode bleed pipe 60 that causes water within the anode bleed pipe 60 to be sucked out. Also, because the orientation of the anode bleed pipe 60 relative to the cathode exhaust gas pipe 50 can be from any direction (up or down), the stand-off portion 62 would provide an increase in the reduction of the water emitted in the anode bleed pipe 60 for all pipe orientations. In one embodiment, the anode bleed pipe 60 comes in from the top of the cathode exhaust gas pipe 50 so that condensation in the pipe 50 will not flow into the anode bleed pipe 60. Further, because the accumulation of water in the anode bleed pipe 60 is reduced, the diameter of the bleed pipe 60 can also be reduced, thus reducing packaging space. Traditional anode bleed pipes may be 100 mm. According to the invention, the diameter of the anode bleed pipe 60 can be reduced to 20 mm or less.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
    a fuel cell stack;
    a cathode exhaust gas line outputting a cathode exhaust gas from the fuel cell stack;
    an anode exhaust gas line outputting an anode exhaust gas from the stack;
    a bleed valve coupled to the anode exhaust gas line for bleeding the anode exhaust gas; and
    an anode bleed line coupled to the bleed valve that receives the anode exhaust gas when the bleed valve is open, said anode bleed line also coupled to the cathode exhaust gas line so that the bled anode exhaust gas is directed into the cathode exhaust gas line, said anode bleed line including a stand-off portion that extends into the cathode exhaust gas line a predetermined distance so as to prevent water in the cathode exhaust gas line from flowing into the anode bleed line.

2. The system according to claim 1 wherein the stand-off portion is about 1 inch long.

3. The system according to claim 1 wherein the diameter of the cathode exhaust gas line is in the 2-3 inch range.

4. The system according to claim 1 wherein the diameter of the anode bleed line is 20 mm or less.

5. The system according to claim 1 wherein the bleed valve is used to periodically bleed the anode exhaust gas during system operation to reduce the accumulation of nitrogen in the anode side of the fuel cell stack.

6. A system according to claim 1 further comprising a controller, said controller calculating the concentration of hydrogen in the anode exhaust gas, and opening the bleed valve if the concentration of hydrogen falls below a predetermined percentage.

7. The system according to claim 1 wherein the anode bleed line is coupled to the cathode exhaust gas line through a top of the cathode exhaust gas line.

8. The system according to claim 1 wherein the system recirculates the anode exhaust gas line to an anode input of the fuel cell stack when the bleed valve is closed.

9. The system according to claim 1 wherein the system employs anode flow shifting.

10. The system according to claim 1 wherein the system is on a vehicle.

11. A fuel cell system comprising:
   a fuel cell stack;
   a cathode exhaust gas line outputting a cathode exhaust gas from the fuel cell stack;
   an anode exhaust gas line outputting an anode exhaust gas from the stack;
   a bleed valve coupled to the anode exhaust gas line for bleeding the anode exhaust gas;
   an anode bleed line coupled to the bleed valve that receives the anode exhaust gas when the bleed valve is open, said anode bleed line also coupled to the cathode exhaust gas line through a top of the cathode exhaust gas line so that the bled anode exhaust gas is directed into the cathode exhaust gas line, said anode bleed line including a stand-off portion that extends into the cathode exhaust gas line a predetermined distance so as to prevent water in the cathode exhaust gas line from flowing into the anode bleed line; and
   a controller that is configured to calculate the concentration of hydrogen in the anode exhaust gas, and opening and closing the bleed valve so as to maintain the concentration of hydrogen above a predetermined percentage.

12. The system according to claim 11 wherein the stand-off portion is about 1 inch long.

13. The system according to claim 11 wherein the diameter of the cathode exhaust gas line is in the 2-3 inch range.

14. The system according to claim 11 wherein the diameter of the anode bleed line is 20 mm or less.

15. A method for reducing the accumulation of water in an anode bleed line of a fuel cell system, said method comprising:
   providing a bleed valve that periodically bleeds an anode exhaust gas from an anode exhaust gas output of a fuel cell stack to the anode bleed line; and
   coupling the anode bleed line to a cathode exhaust gas line so that an end of the anode bleed line extends into the cathode exhaust gas line so as to prevent water in the cathode exhaust gas line from flowing into the anode bleed line.

16. The method according to claim 15 wherein extending the anode bleed line into the cathode exhaust gas line includes extending the end of the anode bleed line about one inch into the cathode exhaust gas line.

17. The method according to claim 15 further comprising controlling the bleed valve to maintain the concentration of hydrogen in the anode exhaust gas above a predetermined percentage.

18. The method according to claim 15 wherein coupling the anode bleed line to a cathode exhaust gas line includes coupling the anode bleed line to a top of the cathode exhaust gas line.

* * * * *